US012103541B2

(12) United States Patent
Furukawa et al.

(10) Patent No.: US 12,103,541 B2
(45) Date of Patent: Oct. 1, 2024

(54) INFORMATION OUTPUT CONTROL METHOD AND INFORMATION OUTPUT CONTROL SYSTEM

(71) Applicant: TOYOTA JIDOSHA KABUSHIKI KAISHA, Toyota (JP)

(72) Inventors: Daisuke Furukawa, Chofu (JP); Toshifumi Nishijima, Kasugai (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 375 days.

(21) Appl. No.: 16/940,649

(22) Filed: Jul. 28, 2020

(65) Prior Publication Data

US 2021/0107492 A1    Apr. 15, 2021

(30) Foreign Application Priority Data

Oct. 9, 2019    (JP) .................................. 2019-186203

(51) Int. Cl.
*B60W 40/09* (2012.01)
*B60W 50/14* (2020.01)
(Continued)

(52) U.S. Cl.
CPC ............ *B60W 40/09* (2013.01); *B60W 50/14* (2013.01); *G06V 20/56* (2022.01); *G06V 20/597* (2022.01);
(Continued)

(58) Field of Classification Search
CPC .................. B60W 40/09; B60W 50/14; B60W 2540/229; B60W 2540/22; G06V 20/597; G06V 20/56
See application file for complete search history.

(56) References Cited

U.S. PATENT DOCUMENTS 9,188,449 B2 * 11/2015 Biswal .............. G01C 21/3697
9,288,270 B1 * 3/2016 Penilla .................. H04L 67/141
(Continued)

FOREIGN PATENT DOCUMENTS

JP    2007-86880 A    4/2007
JP    2008241309 A * 10/2008
(Continued)

OTHER PUBLICATIONS

"Garzon, S.; "Intelligent In-Car-Infotainment System: A Prototypical Implementation;" Jun. 2012; 2012 Eighth International Conference on Intelligent Environments" (Year: 2012).*
(Continued)

*Primary Examiner* — Russell Frejd
*Assistant Examiner* — Christopher R Cardimino
(74) *Attorney, Agent, or Firm* — Oblon, McClelland, Maier & Neustadt, L.L.P.

(57) ABSTRACT

An information output control method includes a step of deriving a driving load of a driver, based on a traveling environment or a driving state of the driver, a step of deciding to suggest a content that meets the derived driving load, to the driver, and a step of calculating a degree of acceptance of the suggested content by the driver. In the deciding step, the frequency of suggestion of the content or the type of the content is set based on the calculated degree of acceptance.

9 Claims, 9 Drawing Sheets

(51) Int. Cl.
*G06V 20/56* (2022.01)
*G06V 20/59* (2022.01)

(52) U.S. Cl.
CPC ... *B60W 2540/22* (2013.01); *B60W 2540/229* (2020.02)

(56) References Cited

U.S. PATENT DOCUMENTS

| | | | | |
|---|---|---|---|---|
| 9,499,051 | B2* | 11/2016 | Akita | B60K 35/00 |
| 9,712,587 | B1* | 7/2017 | Alfishawi | A61B 5/165 |
| 9,771,082 | B2* | 9/2017 | Farrell | B60W 40/08 |
| 10,009,644 | B2* | 6/2018 | Aimone | A61B 5/0022 |
| 10,170,111 | B2* | 1/2019 | Puranik | B60K 35/10 |
| 10,399,575 | B2* | 9/2019 | Spasojevic | A61B 5/0205 |
| 10,850,746 | B2* | 12/2020 | Marti | B60K 35/26 |
| 10,897,650 | B2* | 1/2021 | el Kaliouby | A61B 5/18 |
| 2020/0380389 | A1* | 12/2020 | Eldeeb | G06F 16/285 |

FOREIGN PATENT DOCUMENTS

| | | | |
|---|---|---|---|
| JP | 2011-107936 A | | 6/2011 |
| JP | 2016137200 A | * | 8/2016 |
| JP | 2018-055155 A | | 4/2018 |
| KR | 20130089934 A | * | 8/2013 |

OTHER PUBLICATIONS

June Lee, "Remind Customers of Important Tasks or Events with the Reminders API", https://developer.amazon.com/ja/blogs/alexa/post/e65a0e17-2716-4714-8d02-a50210fdd494/now-available-enableremindersfor-your-skills-with-alexa-reminders-api, Nov. 1, 2018, 2 pages.

Office Action issued Sep. 6, 2022, in corresponding Japanese Patent Application No. 2019-186203 (English Translation only), 4 pages.

Kayoko Bando, "Driving Navigation for Mothers' Peace of Mind", Journal of Denso Technical Disclosure, No. 158, Japan, Denso Corporation, Jan. 15, 2008, pp. 18.

* cited by examiner

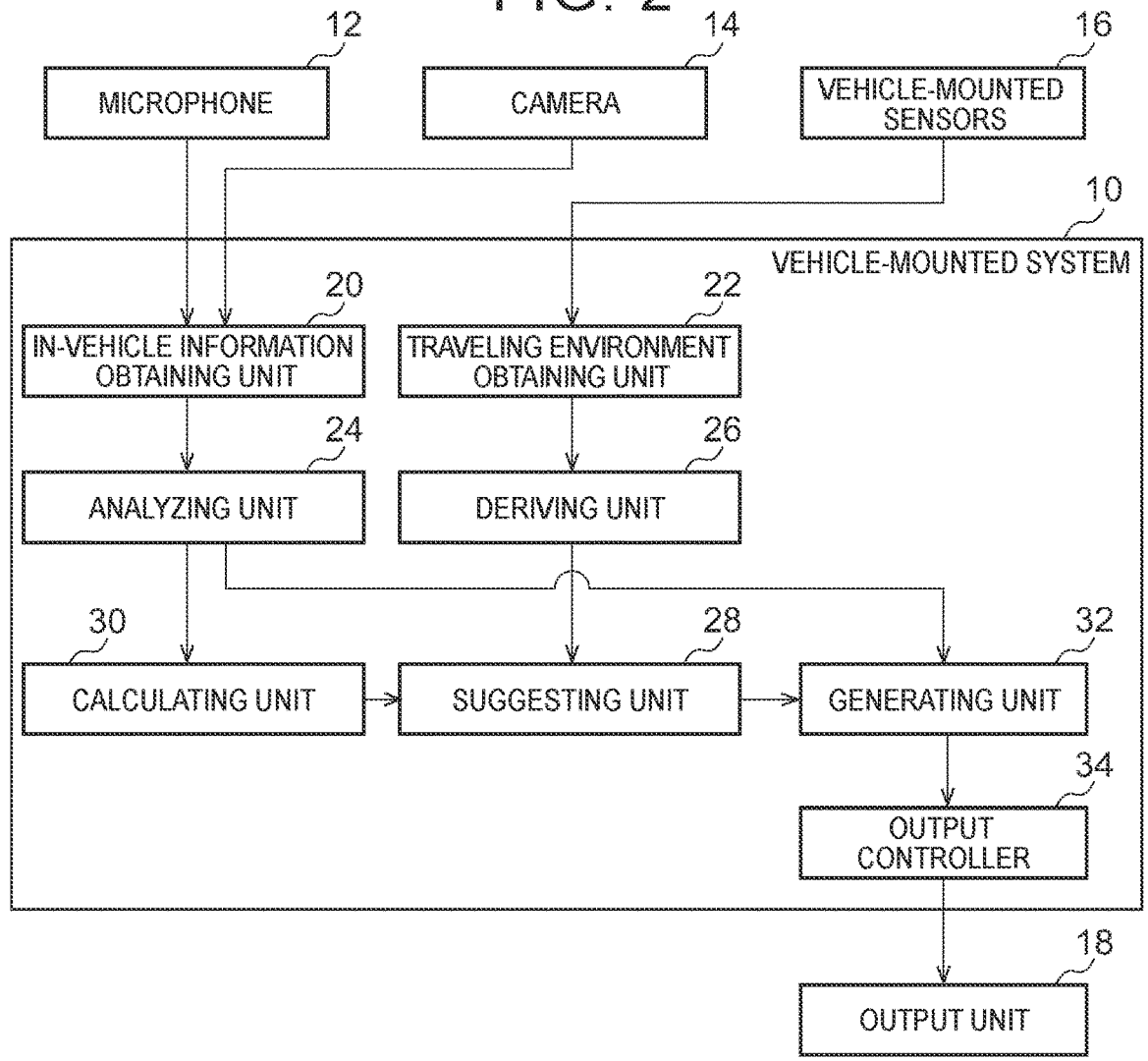

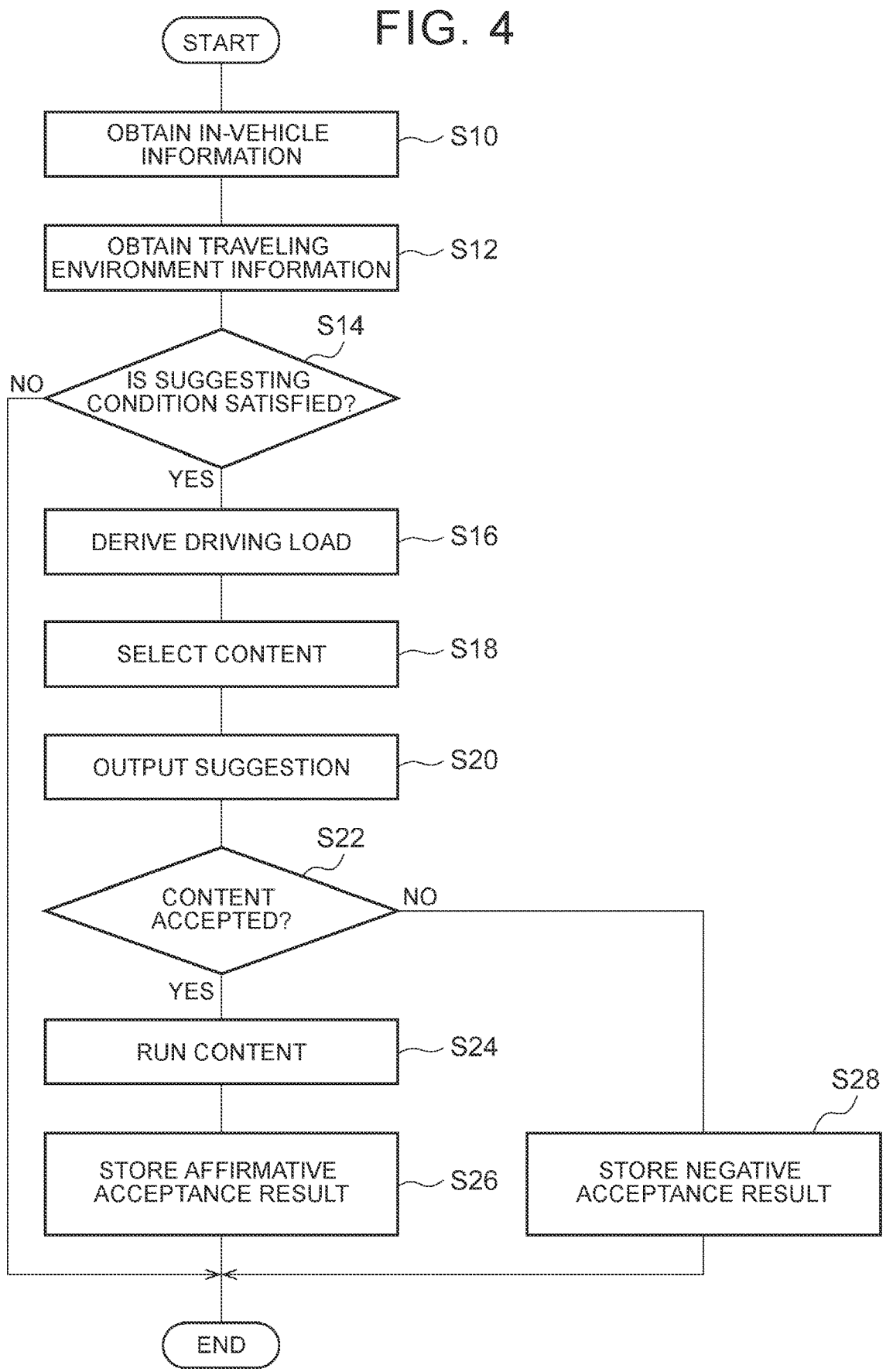

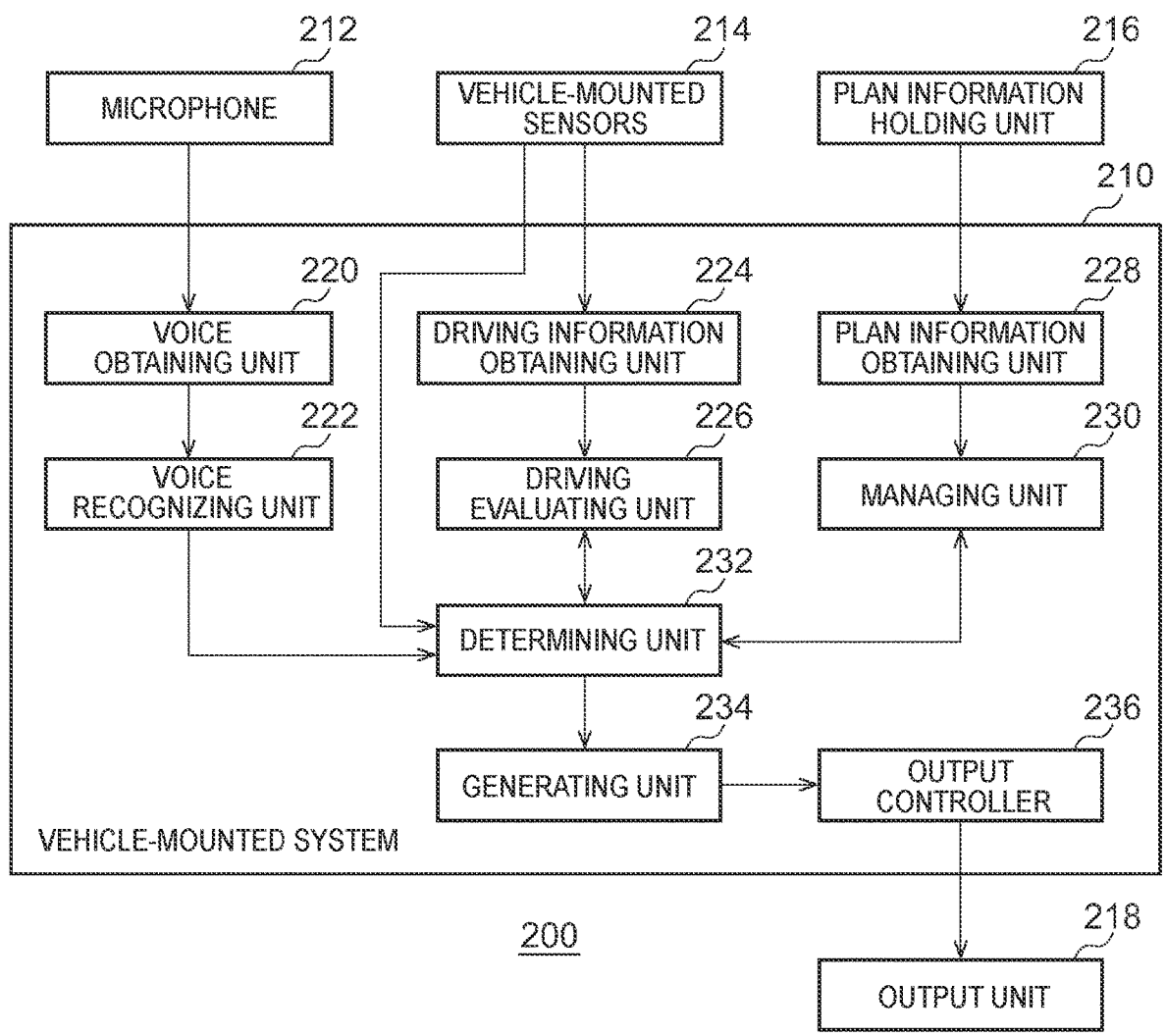

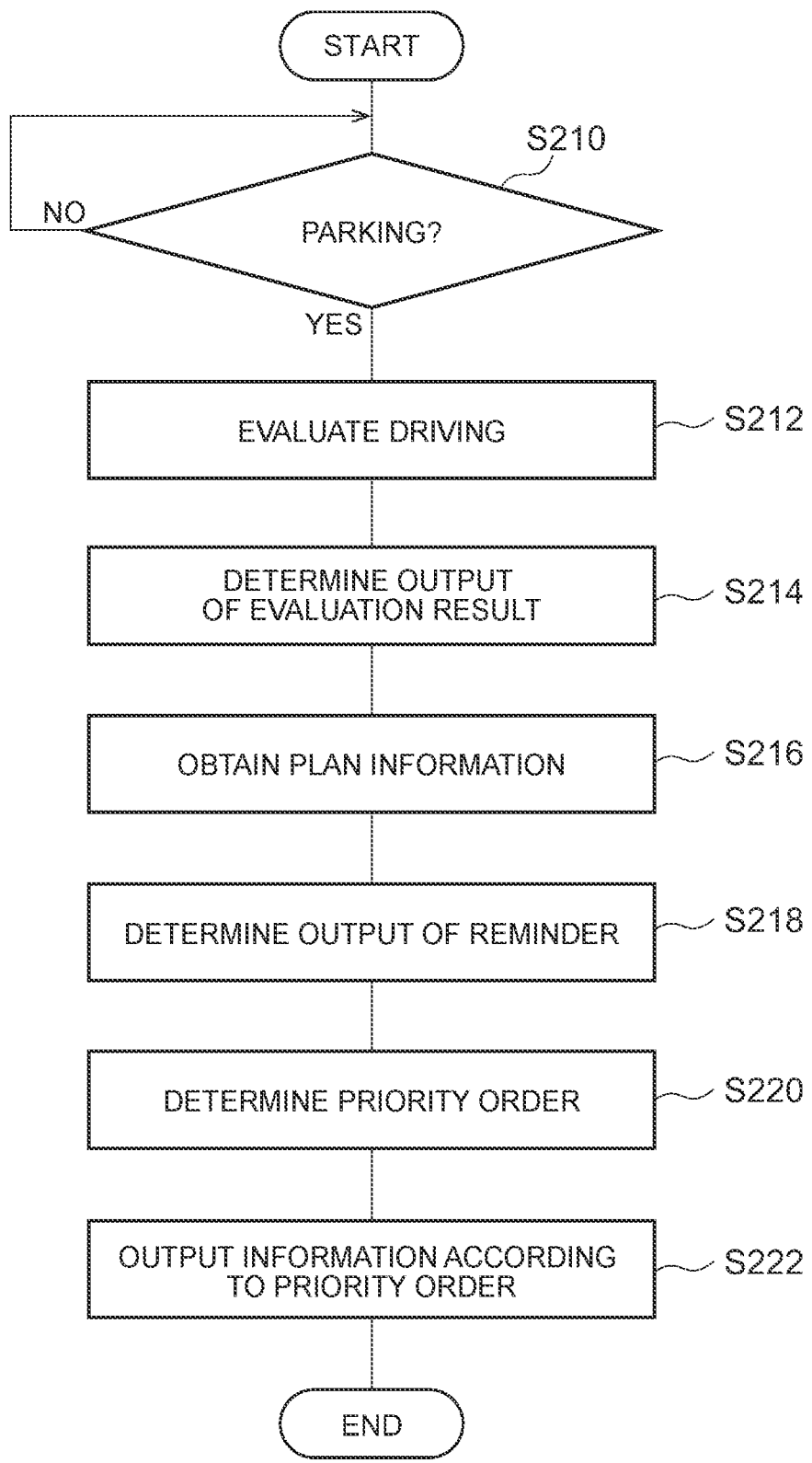

INFORMATION OUTPUT CONTROL METHOD AND INFORMATION OUTPUT CONTROL SYSTEM

INCORPORATION BY REFERENCE

The disclosure of Japanese Patent Application No. 2019-186203 filed on Oct. 9, 2019 including the specification, drawings and abstract is incorporated herein by reference in its entirety.

BACKGROUND

1. Technical Field

The disclosure relates to a technology for outputting information to a user.

2. Description of Related Art

A speech dialogue system disclosed in Japanese Unexamined Patent Application Publication No. 2018-55155 (JP 2018-55155 A) counts the number of users present around the own system, and determines the content of dialogue so as to avoid private or personal information of the users when there are two or more users around the system.

SUMMARY

In the meantime, a plurality of types of contents, such as music, video, radio, and games, is installed on a vehicle, and these contents are run or played so as to amuse occupants in the vehicle. It is desirable to run the contents according to a driving situation.

The disclosure provides a technology for suggesting a content according to the driving situation.

An information output control method according to a first aspect of the disclosure includes the steps of: deriving a driving load of a driver, based on a traveling environment or a driving state of the driver, deciding to suggest a content that meets the derived driving load, to the driver, and calculating a degree of acceptance of the suggested content by the driver. In the deciding step, a frequency of suggestion of the content or a type of the content is set based on the calculated degree of acceptance.

An information output control system according to a second aspect of the disclosure includes a deriving unit that derives a driving load of a driver, based on a traveling environment or a driving state of the driver, a suggesting unit that decides to suggest a content that meets the derived driving load, to the driver, and a calculating unit that calculates a degree of acceptance of the suggested content by the driver. The suggesting unit sets a frequency of suggestion of the content or a type of the content, based on the calculated degree of acceptance.

According to the disclosure, the technology for suggesting a content according to the situation can be provided.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 2 is a view showing the functional configuration of the information output control system of the first embodiment;

FIG. 3 is a view showing an array table indicating the relationship between the level of a driving load and the types of contents;

FIG. 4 is a flowchart illustrating a control routine for suggesting a content;

FIG. 9 is a view showing the functional configuration of the information output control system of the third embodiment; and FIG. 10 is a flowchart illustrating a control routine for outputting output information to a driver during parking.

DETAILED DESCRIPTION OF EMBODIMENTS

Figure 1A:
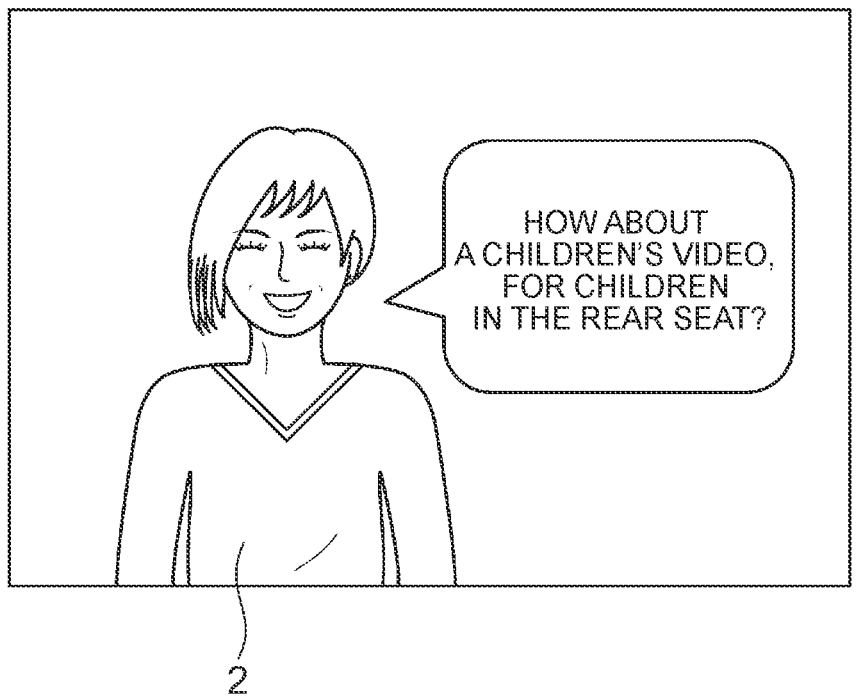
FIG. 1A is a view useful for describing an information output control system of a first embodiment.
Figure 1B:
FIG. 1B is a view useful for describing the information output control system of the first embodiment.

FIG. 1A and FIG. 1B are useful for describing an information output control system of a first embodiment. Each of FIG. 1A and FIG. 1B shows an image displayed on a display installed on a vehicle. The information output control system has a function of having a conversation with the driver, and outputs information to the driver, with an image and voice.

As shown in FIG. 1A and FIG. 1B, a character displayed on the display outputs information to the driver. The character is one form of an agent 2 that gives and receives information to and from the driver mainly via a dialogue, and the agent 2 may have a dialog with the driver only with voice. In any case, the agent 2 provides information concerning traveling in the form of voice and/or image, so as to assist the driver in driving, and also has an everyday dialogue that is not related to traveling, with the driver.

In FIG. 1A, the agent 2 displayed as a character outputs a message for recommending a content to occupants in the rear seat, by saying, "How about a children's video, for children in the rear seat?" The agent 2 recognizes driving conditions of the driver and conditions of the rear seat, and recommends a content suitable for the occupants. If the content is presented to the occupants in the rear seat, the driver can concentrate on driving. The children's video is displayed only on a display on the rear seat side, and may not be displayed on a display on the front side.

In FIG. 1B, the agent 2 outputs a message for recommending a content to the driver, by saying, "You look bored, so may I tell a funny little tale now?" The agent 2 grasps a driving state of the driver, and recommends the content.

The vehicle is installed with a plurality of types of contents, such as music, videos, radio, games, and dialogue with the agent 2, and these contents can be presented to the occupants so as to amuse them. The information output control system of the first embodiment can suggest running any of the contents, to the occupants. It is desirable to suggest a content according to conditions inside the vehicle.

Thus, the information output control system 1 suggests a content according to a driving load of the driver. Also, it is unknown whether the driver accepts the content determined by the agent 2 as appropriate and suggested; therefore, the information output control system 1 calculates the degree by which the driver accepts the suggested content, and executes the suggestion in accordance with the degree of acceptance. Thus, it is possible to make a suggestion that meets the taste of the driver.

FIG. 2 shows the functional configuration of the information output control system 1 of the first embodiment. In FIG. 2, each element described as one of function blocks that perform various operations can be constructed in terms of hardware by a circuit block, memory or other LSI, and is implemented in terms of software by a program loaded into a memory. Thus, it is to be understood by those skilled in the art that these function blocks can be implemented in various forms via only hardware, only software, or a combination thereof, and are not limited to any of these forms.

The information output control system 1 includes a vehicle-mounted system 10, microphone 12, camera 14, vehicle-mounted sensors 16, and output unit 18. The vehicle-mounted system 10 has an in-vehicle information obtaining unit 20, traveling environment obtaining unit 22, analyzing unit 24, deriving unit 26, suggesting unit 28, calculating unit 30, generating unit 32, and output controller 34.

The microphone 12 detects sound inside the vehicle, and sends it to the vehicle-mounted system 10. Speech of the occupant(s) can be detected from the sound inside the vehicle. The camera 14 captures an image of the interior of the vehicle, and sends it to the vehicle-mounted system 10. Thus, the vehicle-mounted system 10 can recognize conditions inside the vehicle.

The vehicle-mounted sensors 16 include a plurality of sensors, such as sensors that detect the outside environment, and sensors that detect traveling conditions. The sensors that detect the outside environment include a camera or cameras that image the vicinity of the vehicle, radar or laser that detects an object around the vehicle, and so forth. The sensors that detect traveling conditions include a sensor that detects the vehicle speed, sensor that detects the acceleration, sensor that detects the steering operation amount, sensor that detects the braking operation amount, and so forth. With these sensors, the vehicle-mounted system 10 can recognize the traveling environment, based on the detection results of the vehicle-mounted sensors 16.

The output unit 18, which is a speaker or a display panel, for example, outputs information to the occupant with an image and voice. The output unit 18 output a response to the driver's voice, or a suggestion of a content as shown in FIG. 1A and FIG. 1B, or the like.

The in-vehicle information obtaining unit 20 of the vehicle-mounted system 10 obtains in-vehicle information from the microphone 12 and the camera 14. The in-vehicle information includes sound inside the vehicle and captured images of the interior of the vehicle. The traveling environment obtaining unit 22 obtains traveling environment information from the vehicle-mounted sensors 16. The traveling environment information may be derived as an index representing one of different levels, which is determined based on the weather, time of day, road conditions, and so forth. For example, the traveling environment is derived as "POOR" when the weather is rainy, the time of day is night, and the road is narrow, for example.

The analyzing unit 24 analyzes the sound inside the vehicle and the captured images of the interior of the vehicle, so as to detect conditions inside the vehicle, e.g., the constitution of the occupant(s) in the vehicle, conversation situation in the vehicle, level of noise in the vehicle, and conditions of the driver, and show the driving state of the driver. The driving state of the driver is information used for deriving a driving load of the driver, and may be an index indicating how busy the driver is. For example, when the driver has a conversation with another occupant, or it is noisy inside the vehicle, the analyzing unit 24 derives the driving state as "BUSY". Also, the analyzing unit 24 recognizes the content of speech of the occupant, and can make a response to the occupant.

The deriving unit 26 derives the driving load of the driver, based on the traveling environment information and/or the driving state of the driver. The driving load of the driver may be an index as one of different levels indicating the load of the driver.

The deriving unit 26 derives the driving load such that it becomes higher as the traveling environment is poorer, and the driving load becomes lower as the traveling environment is better. Also, the deriving unit 26 derives the driving load such that it becomes higher as the driver is busier in the driving state, and the driving load becomes lower as the driver is less busy in the driving state. The level of poorness of the traveling environment is calculated from the detection results of the vehicle-mounted sensors 16. The level of busyness in the driving state of the driver is calculated from the detection results of the microphone 12 and the camera 14.

When a condition of suggestion of a content is satisfied, the suggesting unit 28 selects a content to be suggested. The content suggestion condition is used for determining whether the current time is the right time of suggestion of the content, and may be, for example, that no content is being provided, that music that is being replayed ends, or that a children's video that is being replayed ends.

The suggesting unit 28 decides to suggest a content that meets the driving load derived by the deriving unit 26, to the driver. The suggesting unit 28 may determine the type of the content suggested, by referring to an array table indicating the relationship between the level of the driving load and the type of the content. The array table indicating the relationship between the level of the driving load and the type of the content may be arranged such that the same type of content corresponds to two or more levels of the driving load. Here, the array table indicating the relationship between the level of the driving load and type of the content will be described with reference to a new drawing.

FIG. 3 shows an array table indicating the relationship between the level of the driving load and the type of the content. As the level of the driving load is lower, a content having a large amount of information is more likely to be suggested to the driver, and the number of types of contents suggested is larger. On the contrary, as the level of the driving load is higher, a content having a small amount of information is more likely to be suggested to the driver, so that the load on the driver is reduced.

For example, a dialogue with the agent is a content having a large amount of information, and music is a content having a small amount of information. Also, a children's video that is displayed on a display for the rear seat is used for making a child quiet, and is a content that serves to reduce the load of the driver. Thus, the content is suggested according to the load of the driver, so that the content appropriate for the driving conditions can be provided.

Also, in the array table shown in FIG. 3, the frequency of suggestion may be lower in the order from the first content to the fourth content. Namely, the suggestion probability of each content may be set to be different, and a content may be selected according to the suggestion probability; the suggesting unit 28 may decide to suggest the selected content. Also, "not to suggest any content" may be included as an object selectable, in addition to the above contents, and the probability of selection of "not to suggest any content" may be set to be higher, as the driving load is higher, as compared with the case where the driving load is lower.

The suggesting unit 28 may suggest a content to the driver, at a content suggestion frequency that meets the derived driving load. For example, the suggesting unit 28 increases the content suggestion frequency as the driving load is lower, and reduces the content suggestion frequency as the driving load is higher. Thus, when the driving load of the driver is high, a content is less likely to be suggested, so that the driver can concentrate on driving.

When there are two or more occupants, and the driving load of the driver is high, the suggesting unit 28 may suggest a content to the occupant(s) other than the driver, so as to curb increase of the driving load of the driver. For example, a content that serves to prevent children from making noise is presented, so that the driving load of the driver can be made less likely or unlikely to be increased. Thus, when there are two or more occupants, and the driving load of the driver is equal to or higher than a predetermined value, the suggesting unit 28 may increase the frequency of suggestion of contents to the occupants other than the driver. The predetermined value may be in the fourth row from the top in the table shown in FIG. 3, where the driving load of the driver is equal to or higher than the average.

The frequency of suggestion of each content may be set according to the degree of acceptance of the content by the driver, or usage history. The usage history of each content is stored in the vehicle-mounted system 10. The contents set in the array table indicating the relationship between the level of the driving load and the type of the content may be set based on the degree of acceptance of each content or usage history.

Also, there may be two or more types of array tables indicating the relationship between the level of the driving load and the type of the content, and one of the types of array tables may be selected according to the attributes or properties of the occupants. For example, when the occupants include a child or children, an array table in which contents for children are set is selected. Also, the array table may be selected, depending on the case where the occupants consist solely of male occupants, or the occupants consist solely of female occupants, or the occupants are a mixture of male and female occupants. Namely, the suggesting unit 28 selects an array table indicating the relationship between the level of the driving load and the type of the content, based on the attributes of the occupants, and decides to suggest a content that meets the driving load, referring to the selected array table.

Referring back to FIG. 2, the generating unit 32 generates output information according to determination of the suggesting unit 28, with an image and/or voice. Also, the generating unit 32 generates a response to the occupant's voice recognized by the analyzing unit 24, with an image and/or voice. The output controller 34 controls output of information with an image and/or voice, from the output unit 18 to the occupant.

The calculating unit 30 calculates the degree by which the suggested content is accepted by the driver. The degree of acceptance of the content by the driver may be an index selected from different levels, e.g., three levels of "HIGH", "MIDDLE", and "LOW". The calculating unit 30 obtains the driver's response to the suggestion made by the suggesting unit 28, via the in-vehicle information obtaining unit 20 and the analyzing unit 24, and obtains a record of acceptance for each content.

For example, when the driver replies, "Yes, replay the children's video." to the suggestion shown in FIG. 1A, the calculating unit 30 obtains an affirmative result that the content was accepted. When the driver replies, "No, don't replay it.", the calculating unit 30 obtains a negative result that the content was not accepted. Thus, these records of acceptance are accumulated, and the calculating unit 30 can calculate the degree of acceptance of each content by the driver.

When the degree of acceptance of a certain content by the driver is "HIGH", the frequency of suggestion of the content to the driver is increased. Also, when the degree of acceptance of the content by the driver is "LOW", the frequency of suggestion of the content is reduced, and the frequency of suggestion of other contents becomes relatively high.

The calculating unit 30 may calculate the degree of acceptance for each driving load, apart from the degree of acceptance for each content.

The suggesting unit 28 sets the frequency of suggestion or type of the content, based on the degree of acceptance for each content calculated by the calculating unit 30. For example, the content for which the degree of acceptance is calculated as "HIGH" has a high frequency of suggestion, and the content for which the degree of acceptance is calculated as "LOW" has a low frequency of suggestion. Also, when the degree of acceptance of a certain content is calculated as "HIGH", the same type of contents as this content are more likely to selected. When the degree of acceptance of a certain content is calculated as "LOW", other types of contents than this content are more likely to be selected. As a result, contents that meet the driver's taste are more likely to be suggested.

The suggesting unit 28 may set the frequency of suggestion of the content, based on the degree of acceptance for each driving load calculated by the calculating unit 30. For example, when a certain driving load for which the degree of acceptance is "HIGH" is derived, suggestion of the content is more likely to be executed. When a certain driving load for which the degree of acceptance is "LOW" is derived, suggestion of the content is less likely to be executed. Thus, the frequency of suggestion that meets the driver's preference can be achieved, such that suggestion of the content is less likely to be executed in a condition where the driving load is high, and suggestion of the content is more likely to be executed in a condition where the driving load is low.

The suggesting unit 28 may decide to suggest a content to the driver, at a frequency of suggestion of the content determined according to the in-vehicle conditions detected by the analyzing unit 24. For example, the suggesting unit 28 reduces the frequency of suggestion of the content when the in-vehicle conditions indicate that it is noisy in the vehicle, and increases the frequency of suggestion of the content when the in-vehicle conditions indicate that it is quiet in the vehicle. Thus, the agent 2 can amuse the occupants when it is quiet in the vehicle, and can be prevented from disturbing the occupants when it is noisy in the vehicle.

FIG. 4 is a flowchart illustrating a control routine for suggesting a content. The in-vehicle information obtaining unit 20 obtains in-vehicle information from the microphone 12 and the camera 14 (step S10), and the analyzing unit 24 analyzes the in-vehicle information and recognize conditions inside the vehicle. The traveling environment obtaining unit 22 obtains traveling environment information from the vehicle-mounted sensors 16 (step S12).

The deriving unit 26 determines whether a predetermined suggestion condition is satisfied, namely, whether suggestion timing is appropriate (step S14). When the predetermined suggestion condition is not satisfied (NO in step S14), the current cycle of this routine ends, without suggesting any content.

When the predetermined suggestion condition is satisfied (YES in step S14), the deriving unit 26 derives the driving load of the driver, based on the traveling environment information and/or the driving state of the driver (step S16). The suggesting unit 28 selects a content according to the driving load derived by the deriving unit 26, and decides to suggest the content to the driver (step S18). In this step, the suggesting unit 28 sets the suggestion frequency and type of content, based on the degree of acceptance for each content, and selects the content based on the set suggestion frequency and type of the content.

The generating unit 32 generates speech for suggesting the content determined by the suggesting unit 28, and the output controller 34 suggests the content to the occupant (step S20). The analyzing unit 24 obtains speech of the occupant from the in-vehicle information obtaining unit 20, and determines whether the driver accepts the suggested content (step S22).

When the occupant accepts the suggested content (YES in step S22), the generating unit 32 generates a command to run the content, and runs the content (step S24). The calculating unit 30 obtains the affirmative result of accepting the content, and updates and stores the degree of acceptance (step S26). When the occupant does not accept the suggested content (NO in step S22), the calculating unit 30 obtains the negative result of receiving the content, and updates and stores the degree of acceptance (step S28).

Figure 5A:
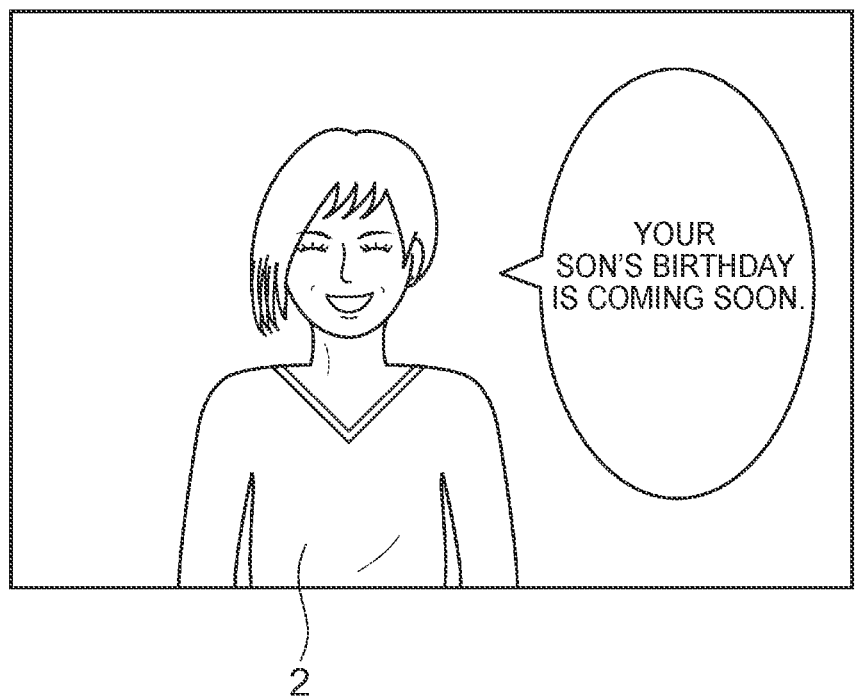
FIG. 5A is a view useful for describing an information output control system of a second embodiment.
Figure 5B:
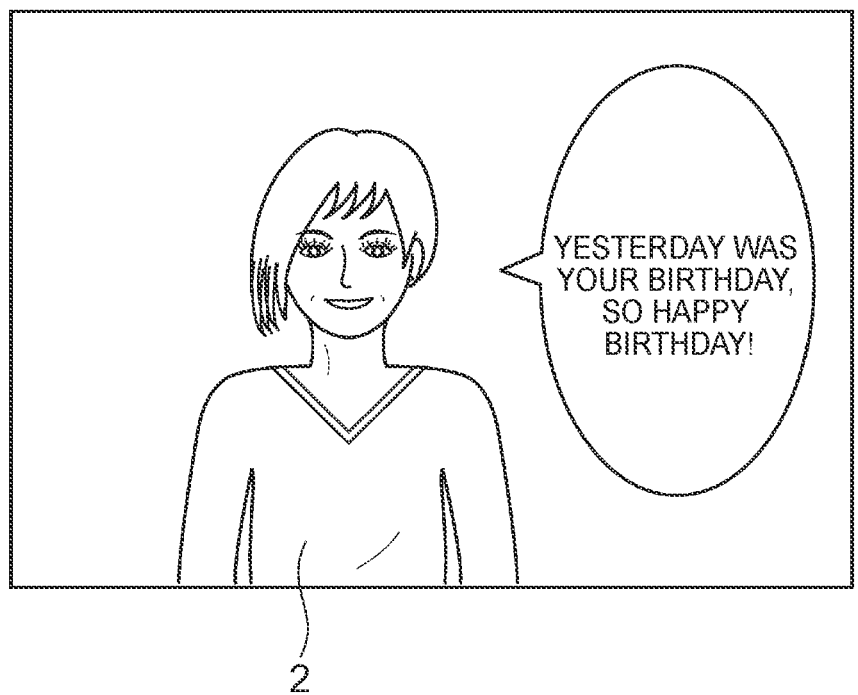
FIG. 5B is a view useful for describing the information output control system of the second embodiment.

FIG. 5A and FIG. 5B are useful for describing an information output control system according to a second embodiment. Each of FIG. 5A and FIG. 5B shows an image displayed on a display installed on a vehicle. The information output control system has a function of having a conversation with the driver, and outputs information to the driver with an image and voice.

As shown in FIG. 5A and FIG. 5B, a character displayed on the display outputs information to the driver. The character is one form of an agent 2 that gives and receives information to and from the driver mainly via a dialogue, and the agent 2 may have a dialog with the driver only with voice. In any case, the agent 2 provides information concerning traveling in the form of voice and/or image, so as to assist the driver in driving, and also has an everyday dialogue that is not related to traveling, with the driver.

In FIG. 5A, the agent 2 displayed as a character outputs information on a special day of a person different from the driver, before the special day, by saying, "Your son's birthday is coming soon." In FIG. 5B, the agent 2 outputs information on a special day of the driver, after the special day, by saying, "Yesterday was your birthday, so happy birthday!" Needless to say, the agent 2 may output information on a special day, on the same date as the special day.

Thus, the agent 2 outputs information on a special day to the user, on the same date as or a date close to the special day. The agent 2 outputs event information, such as schedule information, indicating an event associated with the user, as well as special days. Also, the event associated with the user is not limited to an event of the user himself/herself, but may be that of an acquaintance of the user, for example, the birthday of the user's son as indicated in FIG. 5A. At least the date is set for the event information, and the content of the event is stored in association with the date.

If the time at which the agent 2 outputs event information to the user is far from the date of the event information, the output of the information gives a feeling of mismatch to the user. It is thus preferable that the output of the information is executed within a range of about one week before and after the date of the event information, more preferably, a date close to that of the event information. Also, if the information is conveyed to the driver many times during one week before and after the special day, each time the special day comes closer, the driver may feel bothered or annoyed.

Thus, the information output control system that controls the agent 2 determines the output time of the event information, based on the usage frequency or usage history of a terminal device. For example, when the driver is on board the vehicle every day, the agent 2 is kept from outputting the event information until the date of the event. When the driver is on board the vehicle only on weekends, the agent 2 outputs the event information even if it is several days before the event. Thus, the agent 2 is able to speak to the driver about a topic related to event information, at an appropriate point in time.

Figure 6:
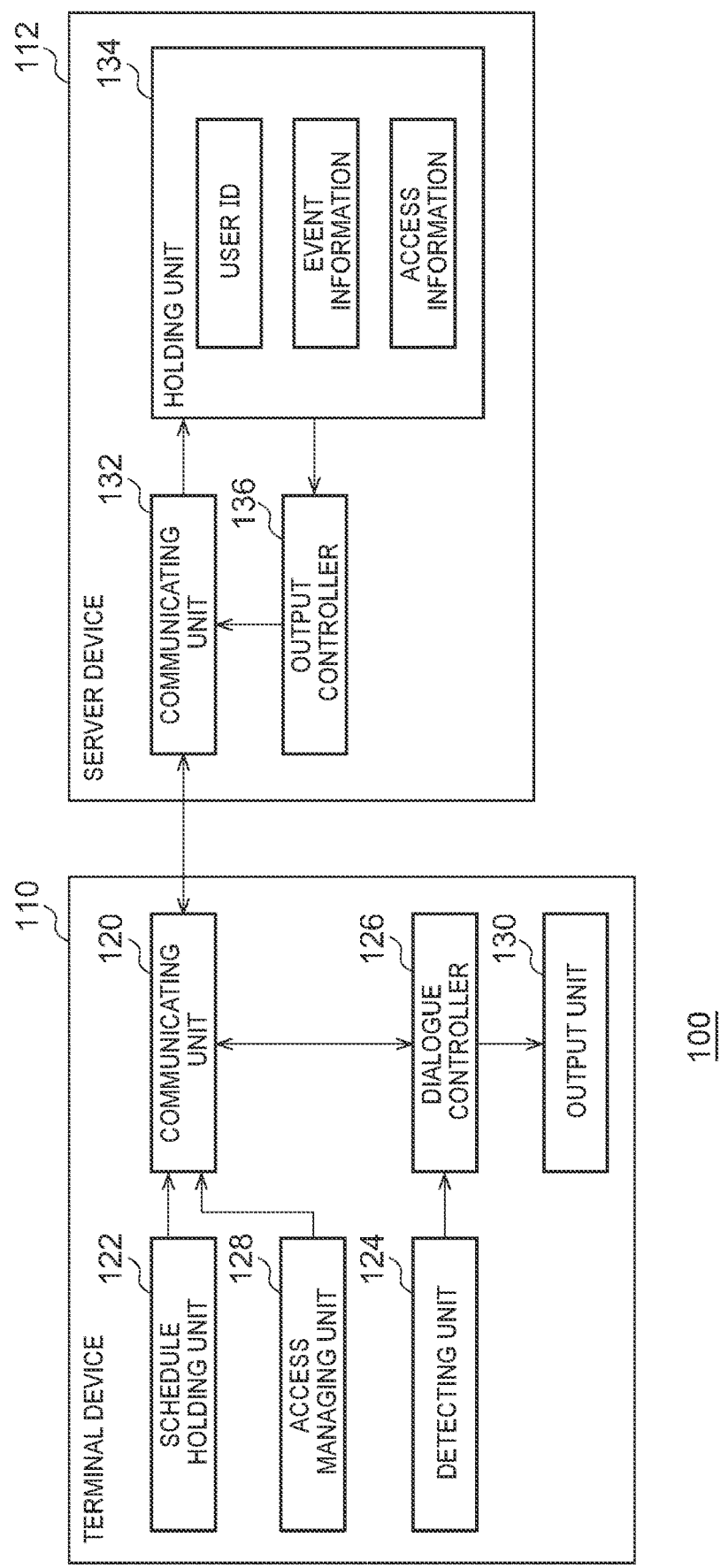
FIG. 6 is a view showing the functional configuration of the information output control system of the second embodiment.

FIG. 6 shows the functional configuration of an information output control system 100 of the second embodiment. In FIG. 6, each element described as one of function blocks that perform various operations can be constructed in terms of hardware by a circuit block, memory or other LSI, and is implemented in terms of software by a program loaded into a memory. Thus, it is to be understood by those skilled in the art that these function blocks can be implemented in various forms via only hardware, only software, or a combination thereof, and are not limited to any of these forms.

The information output control system 100 controls output of event information from a terminal device 110 to the user, and realizes the agent 2 that gives and receives information to and from the user. The information output control system 100 has the terminal device 110 and a server device 112. The terminal device 110 has a communicating unit 120, schedule holding unit 122, detecting unit 124, dialogue controller 126, access managing unit 128, and output unit 130. The server device 112 has a communicating unit 132, holding unit 134, and output controller 136. The terminal device 110 may be installed on the vehicle.

The communicating unit 120 of the terminal device 110 can communicate with the server device 112 via a network, and assigns a vehicle ID or user ID to transmission data when it is transmitted. The schedule holding unit 122 holds schedule information of the user. The schedule information includes the content of each schedule and the date. The schedule information is transmitted, along with the user ID, to the server device 112.

The detecting unit 124 is in the form of a microphone that detects sound in the vehicle or a vehicle-mounted touch panel, and detects information concerning the user. The detecting unit 124 detects voice of the user, for use in a dialogue with the user. The touch panel detects information entered by the user. The detection result of the detecting unit 124 is transmitted to the dialogue controller 126.

The dialogue controller 126 performs a process of recognizing voice detected by the detecting unit 124, and performs a process of generating a response to the user's voice, or speech, such as a query, made to the user. In this connection, the dialogue controller 126 may be provided in the server device 112. In this case, the detection result of the detecting unit 124 is transmitted to the server device 112, where voice processing is performed.

The output unit 130 is in the form of a speaker or a display panel, and outputs information to the user with voice or image. The output unit 130 may output speech generated by the dialogue controller 126, and may also output a character image suitable for the speech.

In this connection, the dialogue controller 126 may obtain event information of the user through voice recognition processing. For example, the dialogue controller 126 may generate a speech for asking the user about a special day, such as a birthday, and obtain information on the special day, from the user. The obtained information on the special day is transmitted to the server device 112. Thus, the information concerning the special day may be obtained through a dialogue with the user.

The access managing unit 128 obtains the usage history of the user, based on ON/OFF information of the terminal device 110. The access managing unit 128 may calculate the usage frequency, based on the usage history. The usage frequency is selected from three levels, i.e., "HIGH", "MIDDLE", and "LOW", for example. The usage frequency is at the level of "HIGH" when the user is on board the vehicle almost every day, and it is at the level of "MIDDLE" when the user is on board several times a week, while it is at the level of "LOW" when the user is on board once or less a week. The access managing unit 128 sends the usage history and/or usage frequency of the user, to the server device 112.

The communicating unit 132 of the server device 112 communicates with a plurality of terminal devices 110 via a network. The holding unit 134 holds the event information of the driver received from the terminal device 110 and the access information of the terminal device 110, in association with the user ID. The user ID may be a vehicle ID, or may be identification information associated with the vehicle ID.

The access information of the terminal device 110 is, for example, the usage history and/or usage frequency of the vehicle of the driver, namely, boarding history and/or boarding frequency. When the terminal device 110 is not the vehicle-mounted device but a portable terminal of the user, the access information may be the usage history and/or usage frequency of the portable terminal.

The output controller 136 generates a command for a speech of the agent 2 based on the user information, and sends the command to the terminal device 110. The output controller 136 controls output of event information from the terminal device 110, based on the date of the event information, and the current date. The output controller 136 determines whether a predetermined output condition is satisfied, based on the date of the event information and the current date, and decides to output the event information from the terminal device 110 when the predetermined output condition is satisfied. The output controller 136 determines output of the event information, based on the usage frequency or usage history of the terminal device 110. Thus, the event information can be generated to the user in appropriate timing.

The output controller 136 generates command information so as to cause the output unit 130 to output a speech that outputs the event information, and sends the command information to the terminal device 110. The command information for the speech may be a text of the speech. The command information for the speech received from the output controller 136 is transmitted to the dialogue controller 126, and the dialogue controller 126 controls the output unit 130 so that the event information is generated from the output unit 130.

The output controller 136 estimates the next usage time of the terminal device 110, based on the usage history of the terminal device 110. For example, the next usage time of the terminal device 110, by the user who uses the terminal device 110 every day, is the next day. Also, the next usage time of the terminal device 110, by the user who uses the terminal device 110 only on weekends, is the most recent Saturday or Sunday.

The output controller 136 compares a period from the estimated next usage time to the date of the event information, with a period from the current date to the date of the event information. The predetermined output condition is satisfied when the period from the current date to the date of the event information is shorter than the period from the next usage time to the date of the event information, and the output controller 136 decides to output the event information.

When the usage frequency of the terminal device 110 is used, the next usage time of the terminal device 110 may be set to the next day of the current date when the usage frequency is "HIGH", and set to be several days after the current date when the usage frequency is "MIDDLE", while it may be set to be one week after the current date when the usage frequency is "LOW". In any case, the output controller 136 estimates the next usage time of the terminal device 110, based on the usage history or usage frequency, and determines whether to output the event information, based on the next usage time thus estimated.

The output controller 136 may change the output time of special day information, between a special day of the user and a special day of an acquaintance of the user. For example, the special day of the acquaintance of the user may be output earlier than the special day of the user. For example, the output controller 136 may allow the special day of the user to be output one week before the special day, and allow the special day of the acquaintance of the user to be output two weeks before the special day. For example, the output controller 136 may decide to output a speech: "Your son's birthday is coming in 10 days, so don't forget about a gift." As a result, the user can have enough time to purchase a commemorative object, such as a gift, for his/her family or acquaintance.

Figure 7:
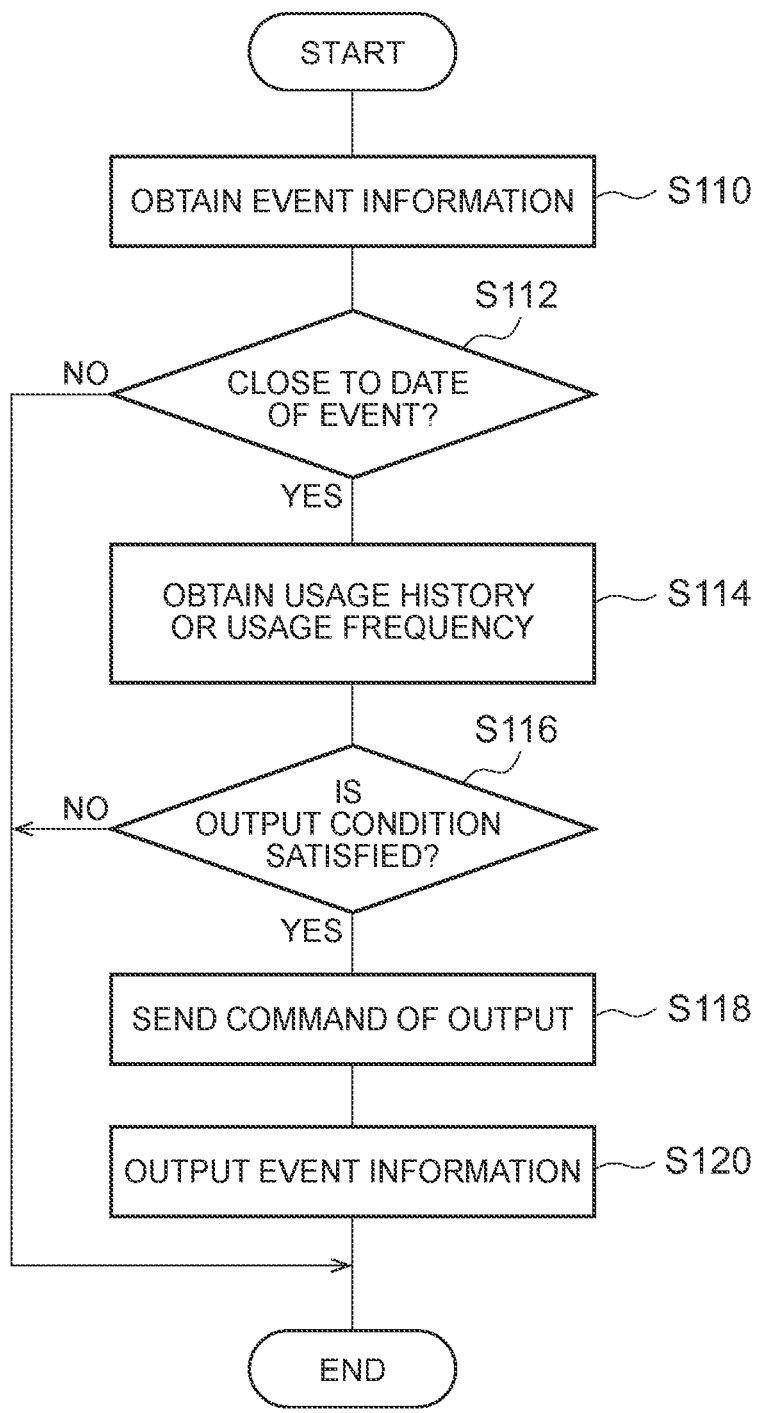
FIG. 7 is a flowchart illustrating a control routine for outputting event information.

FIG. 7 is a flowchart illustrating a control routine for outputting event information. The holding unit 134 of the server device 112 obtains event information including the date, from the terminal device 110, and holds the information (step S110). When the terminal device 110 is in use, the output controller 136 determines whether the date of the event information is close to the current date (step S112). Namely, the output controller 136 determines whether the date of the event information is within a predetermined period from the current date, for example, within one week, or in the same month. The determination as to whether the date of the event information is close to the current date provides a trigger of the process of outputting the event information.

When the current date is not close to the date of the event information (NO in step S112), the event information is not generated, and the control ends. When the current date is close to the date of the event information (YES in step S112), the output controller 136 obtains the usage history or usage frequency of the terminal device 110, from the holding unit 134 (step S114), and determines whether the event information satisfies the predetermined output condition, based on the usage history or usage frequency (step S116). The predetermined output condition is satisfied when the period from the current date to the date of the event information is shorter than the period from the next usage time of the terminal device 110 estimated based on the usage history or usage frequency, to the date of the event information.

When the event information does not satisfy the predetermined output condition (NO in step S116), the event information is not generated, and the control ends. When the event information satisfies the predetermined output condition (YES in step S116), the output controller 136 sends a command of output to the terminal device 110, so that the event information is generated from the terminal device 110 (step S118). The output command of the event information may be a text of a speech that outputs the event information. When the terminal device 110 receives the output command of the event information from the output controller 136 of the server device 112, it outputs the event information to the user (step S120).

The output controller 136 may determine whether to output the event information, based on the usage history and/or usage frequency of an application program provided in the terminal device 110. The application program has at least the function of having a dialogue with the user.

While the holding unit 134 and the output controller 136 are provided in the server device 112 in the second embodiment, the disclosure is not limited to this arrangement, but the holding unit 134 and the output controller 136 may be provided in the terminal device 110.

Figure 8A:
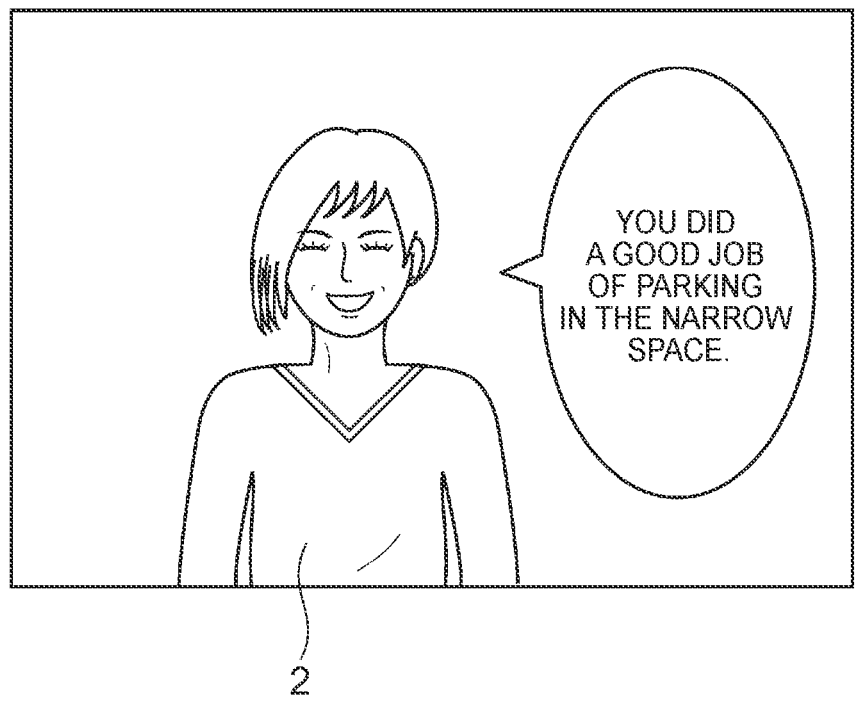
FIG. 8A is a view useful for describing an information output control system of a third embodiment.
Figure 8B:
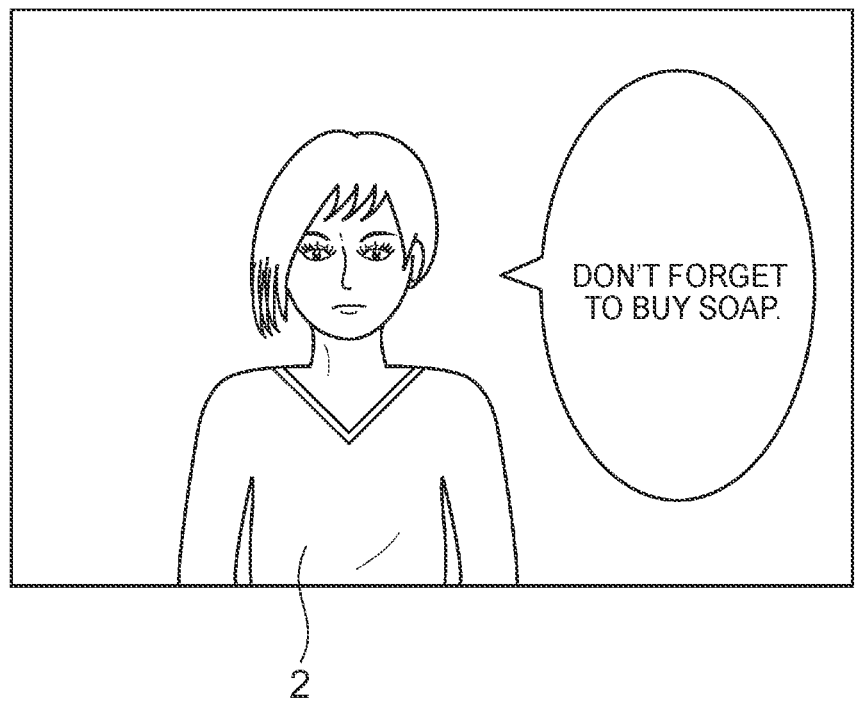
FIG. 8B is a view useful for describing the information output control system of the third embodiment.

FIG. 8A and FIG. 8B are useful for describing an information output control system according to a third embodiment. Each of FIG. 8A and FIG. 8B shows an image displayed on a display installed on a vehicle. The information output control system has a function of having a dialogue with the driver, and outputs information to the driver with an image and voice.

As shown in FIG. 8A and FIG. 8B, a character displayed on the display outputs information to the driver. The character is one form of an agent 2 that gives and receives information to and from the driver mainly via a dialogue, and the agent 2 may have a dialog with the driver only with voice. In any case, the agent 2 provides information concerning traveling with voice and/or image, so as to assist the driver in driving, and also has an everyday dialogue that is not related to traveling, with the driver.

In FIG. 8A, the agent 2 displayed as a character outputs a message for praising a driving result obtained when the vehicle is parked, by saying, "You did a good job of parking in the narrow space." Namely, the agent 2 evaluates the driving result of the driver, and outputs the result of the evaluation. While the agent 2 outputs an affirmative evaluation against the driving result in the example of FIG. 8A, the agent 2 may output a negative evaluation, such as "Previous right turn was untimely and dangerous."

In FIG. 8B, the agent 2 outputs a message for checking with the driver, namely, a reminder for a task, when the driver gets off the vehicle, by saying, "Don't forget to buy soap." Thus, the agent 2 reminds the driver of task information set by the driver. Also, the agent 2 may remind the driver of schedule information, as well as the task information. The task information and the schedule information will be called "plan information of the driver" when they are not distinguished from each other.

When the driver gets off the vehicle, the agent 2 may output evaluation of the driving result, or output a reminder for a task or schedule, or output facility information around a parking place, or output a response in a conversation. However, the length of time from when the driver parks the vehicle to when a vehicle-mounted power supply is turned off is short, and only one piece of output information, among a plurality of kinds of output information, may be generated. Thus, the information output control system sets priorities of these kinds of output information when the vehicle is parked, and provides useful information to the driver.

FIG. 9 shows the functional configuration of the information output control system 200 of the third embodiment. In FIG. 9, each element described as one of function blocks that perform various operations can be constructed in terms of hardware by a circuit block, memory or other LSI, and is implemented in terms of software by a program loaded into a memory. Thus, it is to be understood by those skilled in the art that these function blocks can be implemented in various forms via only hardware, only software, or a combination thereof, and are not limited to any of these forms.

The information output control system 200 outputs output information, such as a response to voice of the driver, a reminder for a task or schedule, or driving evaluation information, to the driver, and realizes the agent 2 that gives and receives information to and from the driver.

A microphone 212 detects sound inside the vehicle, and sends it to a vehicle-mounted system 210. Speech of the driver can be detected from the sound inside the vehicle. Vehicle-mounted sensors 214 include a plurality of sensors, such as sensors that detect the outside environment, and sensors that detect traveling conditions. The sensors that detect the outside environment include a camera or cameras that image the vicinity of the vehicle, radar or laser that detects an object around the vehicle, and so forth. The sensors that detect traveling conditions include a sensor that detects the vehicle speed, sensor that detects the acceleration, sensor that detects the steering operation amount, sensor that detects the braking operation amount, and so forth. Thus, the vehicle-mounted system 210 can evaluate the driving result of the driver, based on the detection results of the vehicle-mounted sensors 214.

The plan information holding unit 216 holds plan information set by the driver, and provides the plan information to the vehicle-mounted system 210. The plan information holding unit 216 may be a server device installed in a data center, or may be a portable terminal device of the driver. Also, the plan information holding unit 216 may receive plan information obtained by the vehicle-mounted system 210 via voice or entry of the driver, from the vehicle-mounted system 210, or may obtain plan information from a portable terminal device of the driver. The plan information includes at least one of the schedule information and the task information.

The schedule information includes schedule content information, destination information, and scheduled time information, and the task information includes at least task content information. The task information may not include location information and scheduled time information like the schedule information. The task information includes a task content, such as purchase of a book, purchase of a drug medicine, deposit at a bank, or price survey on outdoor goods, and may further include time limit information. The task information may be deleted upon entry of the user or passage of the time limit.

The output unit 218, which is a speaker or a display panel, for example, outputs information to the driver with an image or voice. As shown in FIG. 8A and FIG. 8B, the output unit 218 outputs a response to voice of the driver, reminder for plan information, driving evaluation information, etc.

The vehicle-mounted system 210 includes a voice obtaining unit 220, voice recognizing unit 222, driving information obtaining unit 224, driving evaluating unit 226, plan information obtaining unit 228, managing unit 230, determining unit 232, generating unit 234, and output controller 236.

The voice obtaining unit 220 obtains voice information of the driver, based on the in-vehicle sound detected by the microphone 212. The voice recognizing unit 222 analyzes the obtained voice information of the driver, and recognizes the content of speech of the driver. The voice recognizing unit 222, which recognizes the content of the speech of the driver, decides to make a response to the speech. Thus, when the driver speaks to the agent 2, the agent 2 can make a response.

The driving information obtaining unit 224 obtains driving information as detection results of the vehicle-mounted sensors 214. The driving evaluating unit 226 evaluates the driving result of the driver, based on the obtained driving information. For example, the driving information obtaining unit 224 evaluates safe driving or evaluates steering during parking. The safe driving is evaluated, based on elements, such as the traveling speed, the number of times of lane departure, distance between vehicles, and brake timing, and an index concerning safe driving is selected from different levels. The parking operation is evaluated, based on the number of times of steering (turning of the steering wheel) during parking, and the position of the vehicle relative to parking space, and an index concerning parking operation is selected from different levels. The driving evaluating unit 226 provides an affirmative evaluation when the index concerning safety driving or parking operation is equal to or higher than a predetermined first threshold value, and provides a negative evaluation when it is equal to or lower than a predetermined second threshold value. The information concerning the driving evaluation is generated to the driver.

The plan information obtaining unit 228 obtains plan information indicating a task or schedule of the driver, from the plan information holding unit 216. The managing unit 230 manages the obtained plan information, and determines whether a reminder is to be generated so as to prevent the driver from forgetting the plan information.

When there is task information indicating purchase of a book, and it is detected, based on position information of the vehicle, that the vehicle was parked at or in the vicinity of a book store, the managing unit 230 decides to remind the driver of the task of purchase of the book. Namely, when the vehicle is parked at a position where the task content can be carried out, the managing unit 230 decides to remind the driver of the task content. When the expected arrival time is within a predetermined period from the scheduled clock time, based on the relationship between the current position, and a destination and scheduled time information indicated in the schedule, the managing unit 230 decides to remind the driver of the schedule.

When the output times of two or more kinds of output information, such as a response to voice recognized by the voice recognizing unit 222, driving evaluation, guide information of the vicinity of the parking position, and a reminder for plan information, overlap, the determining unit 232 determines priorities of these kinds of output information. The determining unit 232 determines the priorities of the two or more kinds of output information, according to a predetermined output condition.

The output condition of the determining unit 232 at the time of parking specifies that priorities of the response to voice, driving evaluation, guide information of the vicinity of the parking position, and reminder for plan information are set in the order of plan information, response to voice, driving evaluation, and guide information of the vicinity of the parking position. Thus, the determining unit 232 decides to preferentially output the reminder for plan information. Thus, when there are two or more items of information to be transmitted to the driver at the time of parking, the priority order of the output is set, and information can be provided in the order starting from useful information, by the time when the driver leaves the vehicle.

The determining unit 232 determines that the vehicle is being parked, by determining that the vehicle has arrived at a destination set in a navigation system, or the vehicle has entered the parking place, or a parking brake is placed in the ON position. The determination that the vehicle is being parked is a trigger that starts the process of determining priorities of the output information during parking.

The determining unit 232 may use a distance between the destination of the schedule information and the current vehicle position, when determining the priority of a reminder for schedule information in the plan information. For example, when the distance between the destination of the schedule information and the current vehicle position is equal to or larger than a predetermined distance, the determining unit 232 may determine the priority of the reminder for the schedule information, to be lower than those of the response to voice and the driving evaluation.

The determining unit 232 decides to preferentially output the response to voice of the driver, over the driving evaluation. Thus, the response that interrupts or finishes a conversation with the driver can be generated during parking. Also, when a driving evaluation that is equal to or higher than a significantly high predetermined value is calculated, the determining unit 232 may decide to preferentially output the driving evaluation, over the response to voice of the driver. For example, when the detected driving result shows that the driver smoothly parked the vehicle in a parking space where he/she usually parks the vehicle while turning the steering wheel to the right and left many times, the determining unit 232 may decide to preferentially output the driving evaluation, over the response to voice of the driver and the reminder for plan information. This can make the user happy.

The determining unit 232 decides to preferentially output an affirmative driving evaluation, over a negative driving evaluation. Thus, the agent 2 can smoothly communicate with the driver.

The generating unit 234 generates speech, such as a response to voice recognized by the voice recognizing unit 222, driving evaluation, and a reminder for plan information. When the output times of a plurality of kinds of output information overlap, the output controller 236 outputs the output information according to the priority order determined by the determining unit 232.

In this connection, the output information of all of the response to voice, driving evaluation, guide information of the vicinity of the parking position, and the reminder for plan information is not necessarily generated during parking. The output controller 236 may refer to the output information according to the priority order, and may output any output information if it is referred to.

FIG. 10 is a flowchart illustrating a control routine for generating output information to the driver during parking. The determining unit 232 determines whether the vehicle is parked, based on whether the vehicle has arrived at a destination set in the navigation system, or the vehicle has entered the parking place, or the parking brake is placed in the ON position (step S210). The determining unit 232 monitors the time at which the vehicle is parked (NO in step S210), and detects that the vehicle is parked (YES in step S210).

The driving information obtaining unit 224 obtains driving information, and the driving evaluating unit 226 calculates an index concerning driving, which indicates how well the driver drives the vehicle, based on the driving information (step S212), and determines whether to output an evaluation result, based on the calculated index concerning driving (step S214).

Also, the plan information obtaining unit 228 obtains plan information indicating the task or schedule of the driver (step S216), and the managing unit 230 determines whether to output a reminder for the plan information, based on position information of the vehicle (step S218).

The determining unit 232 determines the priority order of the reminder for plan information, to be higher than that of the driving evaluation information (step S220), and the output controller 236 outputs the output information according to the priority order (step S222).

It is to be understood by those skilled in the art that the embodiments are merely exemplary, various modified examples can be provided from combinations of constituent elements in the embodiments, and that these modified examples are also within the scope of the disclosure.

The information output control systems of the first embodiment to the third embodiment share a feature that the agent 2 outputs information to the user with voice and/or image, and a feature that the system is used for the driver inside the vehicle. The respective configurations of the information output control systems of the first embodiment to the third embodiment may be combined.

For example, the information output control system 1 of the first embodiment may be combined with the information output control system 100 of the second embodiment, so that the suggesting unit 28 can determine suggestion of a content, based on the usage history of the content.

Also, the information output control system 1 of the first embodiment may be combined with the information output control system 200 of the third embodiment, so that the suggesting unit 28 preferentially outputs plan information, over suggestion of a content.

What is claimed is:

1. An information output control method, comprising the steps of:
deriving a driving load of a driver based on a traveling environment or a driving state of the driver;
deciding to suggest a content or not to suggest any content based on the derived driving load, to the driver, such that:
as a level of the derived driving load is lower:
a content having a larger amount of information is more likely to be suggested to the driver; and
a probability of selecting not to suggest any content is lower, and as the level of the derived driving load is higher:
a content having a smaller amount of information is more likely to be suggested; and
the probability of selecting not to suggest any content is higher; and
calculating a degree of acceptance of the suggested content by the driver, wherein
a frequency of suggestion of the content or a type of the content is set based on the calculated degree of acceptance, in the deciding step, and
a first collection of the content, whose frequency of suggestion is lower, includes a same type of content for two or more levels of the derived driving load and a second collection of the content, whose frequency of suggestion is higher than the first collection, includes different types of content;
outputting a suggestion of the content to the driver;
receiving an input from the driver accepting the suggested content; and
outputting the suggested content via at least one of a speaker or a display panel.

2. The information output control method according to claim 1, wherein the content is suggested to the driver at the frequency of suggestion of the content based on the derived driving load, in the deciding step.

3. The information output control method according to claim 1, wherein, when there are two or more occupants and the derived driving load is equal to or higher than a predetermined value, the frequency of suggestion of a content suggested to one or more occupants other than the driver is increased, in the deciding step.

4. The information output control method according to claim 3, wherein the predetermined value is an average driving load.

5. The information output control method according to claim 1, wherein
as the level of the derived driving load is lower, a number of different types of content suggested is larger, and
as the level of the driving load is higher, the number of different types of content suggested is smaller.

6. The information output control method according to claim 1, wherein
the degree of acceptance is calculated for each of a plurality of the driving load, and
the frequency of suggestion of the content or the type of the content is set based upon the degree of acceptance calculated for each of the driving loads.

7. The information output control method according to claim 6, wherein the frequency of suggestion of the content or the type of the content is set based upon the degree of acceptance calculated for each of the driving loads such that the frequency of the suggestion is higher when a driving load is derived for which the degree of acceptance is a first predetermined level than when a driving load is derived for which the degree of acceptance is a second predetermined level lower than the first predetermined level.

8. The information output control method according to claim 1, wherein the suggestion of the content that is output to the driver is a first type of data including generated speech, and the suggested content that is output in response to receiving the input from the driver is a second type of data that is different from the first type of data and includes at least one of music, radio, or video.

9. An information output control system, comprising:
circuitry configured to:
derive a driving load of a driver based on a traveling environment or a driving state of the driver;
decide to suggest a content based on the derived driving load, to the driver, such that:
as a level of the derived driving load is lower, a content having a larger amount of information is more likely to be suggested to the driver, and
as the level of the derived driving load is higher, a content having a smaller amount of information is more likely to be suggested;
decide not to suggest any content based on the derived driving load, to the driver, such that:

as the level of the derived driving load is lower, a probability of selecting not to suggest any content is lower, and as the level of the derived driving load is higher, the probability of selecting not to suggest any content is higher; and calculate a degree of acceptance of the suggested content by the driver, wherein a frequency of suggestion of the content or a type of the content is set based on the calculated degree of acceptance, and a first collection of the content, whose frequency of suggestion is lower, includes a same type of content for two or more levels of the derived driving load and a second collection of the content, whose frequency of suggestion is higher than the first collection, includes different types of content;

output a suggestion of the content to the driver;

receive an input from the driver accepting the suggested content; and output the suggested content via at least one of a speaker or a display panel.

\* \* \* \* \*